Aug. 14, 1951     A. W. MOFFAT ET AL     2,564,492
ADHESIVE APPLYING MACHINE
Filed Oct. 18, 1946
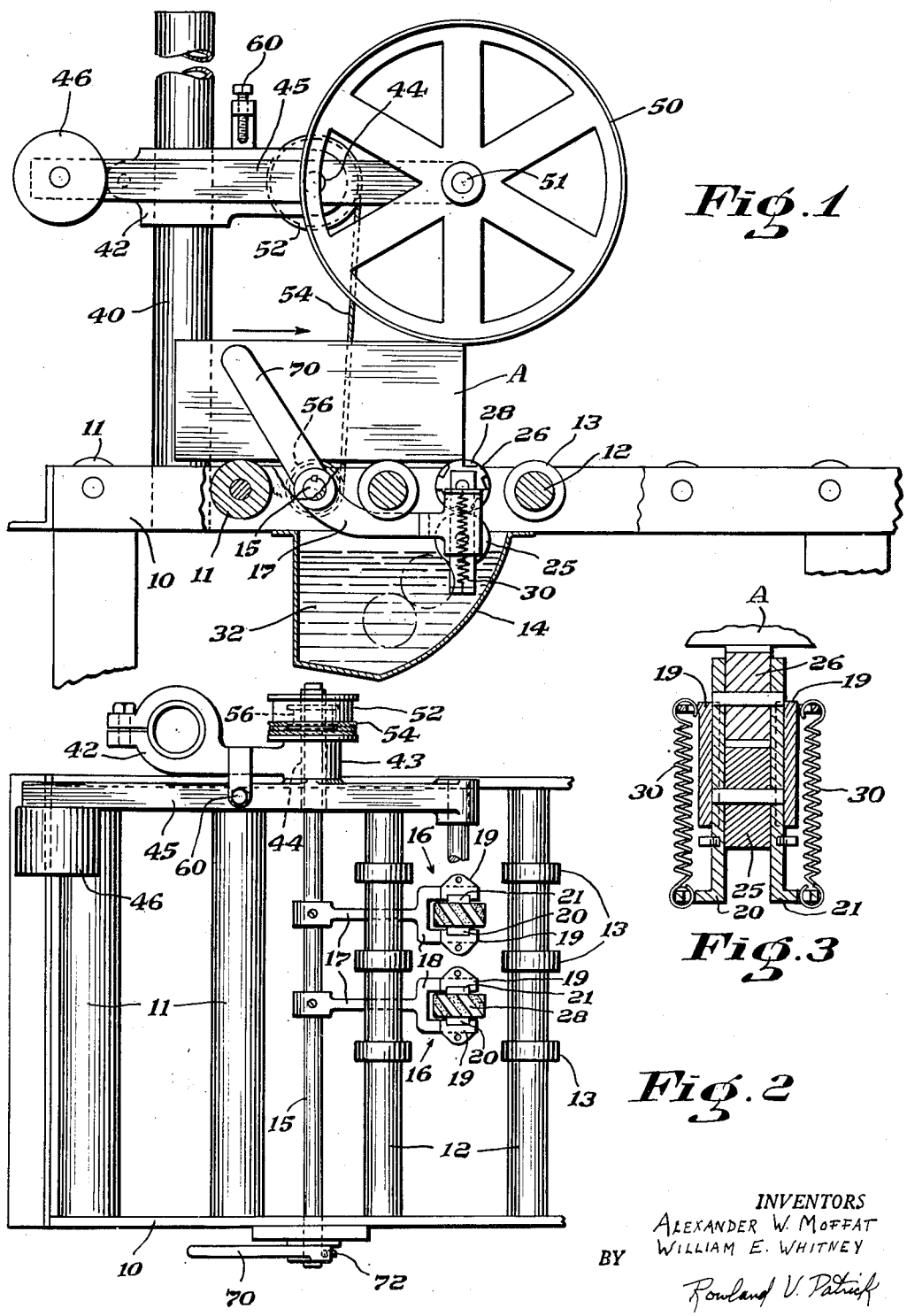
INVENTORS
ALEXANDER W. MOFFAT
WILLIAM E. WHITNEY
BY
Rowland V. Patrick
ATTORNEY Patented Aug. 14, 1951

2,564,492

UNITED STATES PATENT OFFICE 2,564,492

ADHESIVE APPLYING MACHINE

Alexander W. Moffat, Boston, and William E. Whitney, Belmont, Mass., assignors, by mesne assignments, to Materials Handling Laboratories, Inc., Boston, Mass., a corporation of Massachusetts Application October 18, 1946, Serial No. 704,150

10 Claims. (Cl. 91—12)

This invention relates to apparatus particularly useful in connection with the loading of a multiplicity of transportable units onto a pallet or skid, and comprises apparatus for automatically applying adhesive to external surfaces of the units, for example, corrugated paper boxes, as they pass along a conveyor so that as they are lifted from the end of the conveyor and stacked on a pallet, they will bear adhesive areas which will stick to the pallet and/or adjacent units already or later to be positioned on the pallet to form a substantially rigid load of adhesively interlocked units.

Preferably the apparatus applies the adhesive to each unit in separated patches so that, in unloading the units from the pallet, there will be a minimum of damage to the surfaces of the units in the breaking of the adhesive bond.

Objects of the invention include the provision of apparatus for automatically applying adhesive in patches to the undersurface of articles passing along a conveyor; the provision of such an apparatus for applying the adhesive in longitudinally and laterally spaced patches; the provision of such an apparatus which includes an applicator mechanism which will not become fouled or caked with dried adhesive even though quick drying adhesive be utilized; the provision of such an apparatus that is adjustable for automatically acting on articles of various size; the provision of such an apparatus that requires only slight manual power for operation; together with other objects which will in part be expressed and in part be apparent from a more detailed description of the invention to be given with reference to the accompanying drawings in which:

Fig. 1 is a side elevation of adhesive applicator mechanism in accordance with this invention associated with a conventional type of roller conveyor, only portions of which are shown, and other portions of which are broken away;

Fig. 2 is a plan view thereof; and

Fig. 3 is a detailed cross-sectional view of one of the operating parts.

Conventional present-day roller conveyor equipment comprises a frame and a series of parallel rollers usually spaced on 4" centers and over which boxes and other units are adapted to be moved along a plane, either by being manually pushed or by being conveyed by gravity through inclination of the frame.

The positions of such a frame 10 and rollers 11 are illustrated in the drawing, it being understood that the mechanism to be disclosed may be adapted for association with any conventional roller conveyor.

The conveyor indicated in the drawing departs from a conventional conveyor in having substituted for some of rollers 11 of normal diameter a series of shafts 12 of less diameter, but carrying spaced collars 13 of the same diameter as rollers 11. It should be understood that all shafts of the conveyor to the right of the shafts 12 in Fig. 2 may be and preferably are substantially identical with the shafts 12 particularly for a distance sufficient to enable an article to pass along the conveyor well beyond the point shown in the drawing, thus providing in effect a series of longitudinally alined rows of laterally spaced rollers 13.

Mounted beneath the conveyor and substantially beneath the two conveyor shafts 12 is a tank 14 adapted to hold a body of liquid adhesive. Journalled on the frame 10 above one end of the tank 14 is a shaft 15 and keyed thereto a pair of identical applicator mechanisms 16. Each of these mechanisms includes an arm 17 ending in a bifurcated portion 18 carrying a pair of opposed slideways 19. Mounted between the slideways 19 are slides 20 and 21 having journalled therein a lower feed roll 25 and an upper applying roll 26. The upper roll 26 has an interrupted surface, being cut diagonally to form relieved portions 28 as shown in Figs. 1 and 2. The lower roll 25 has a substantially cylindrical surface.

Springs 30 are connected between the ways 19 and the slides 20 and 21 for the purpose of normally urging the slides 20 and 21 and the rolls 25 and 26 upwardly relative to the arms 17, for a purpose to be later described.

The applicator mechanisms 16 just described may be pivoted, through oscillation of the shaft 15, from the position shown in full lines in Fig. 1 of the drawing, wherein the rolls 26 extend upwardly between the two shafts 12 and into contact with the bottom surface of a box A passing along the conveyor, to a position indicated by the dotted circles of Fig. 1 wherein both the rolls 25 and 26 are completely submerged below the normal operating level of a liquid adhesive 32 contained within the tank 14.

Such pivotal movement is responsive to the movement of an actuating mechanism mounted over the conveyor on a standard 40 fastened to and extending upwardly from one side of the conveyor frame 10. A bracket 42, adjustably movable vertically of the standard 40 carries at its end a bearing 43 in which is journalled a shaft 44 carrying at its inner end and fixed thereto a horizontally extending rocker arm 45, on the rear end of which is mounted a counterweight 46 and on the forward end of which is journalled a wheel 50 on a stud shaft 51. The wheel is disposed in a vertical plane substantially midway between mechanisms 16.

The outer end of shaft 44 carries a pulley 52, this pulley being adapted to be fixed relative to shaft 44 or loosened for rotation relative thereto by the movement of a set screw, not shown, for a purpose to be described. Anchored to the pulley 52 and wound around the same is a cable 54 which runs downwardly and takes a turn or two around a smaller pulley 56 fast on the outer end of shaft 15. In this manner when the parts are in the position shown in Fig. 1, the movement of a unit of the height of unit A along the conveyor into a position over the applicator mechanism 16 and beneath wheel 50 will cause shaft 51 and arm 45 to rock upwardly relative to bearing 43, aided by the action of counterweight 46, to rotate pulley 52, wind up cable 54 thereon to rotate pulley 56 and shaft 15 and cause arms 17 and the associated mechanisms carried thereby as previously described to move to the positions shown in Fig. 1. During this operation and as the rolls 26 come into contact with the box A, their engagement with the box A is cushioned by the action of the slide arrangements of the applicator mechanisms which permit the slides 20, 21 to move yieldingly downwardly against the tension of the springs 30, so that while the box A is beneath wheel 50, there will be a yielding engagement of both rolls 26 against the bottom of the box.

While the wheel 50 is shown in a relatively elevated position in Fig. 1, caused by the presence of the box A thereunder, it will be understood from the drawings that, when the box A passes beyond the wheel 50, the turning moment of arms 17 will cause rotation of the shaft 15, downward movement of the cable 54, rotation of pulley 52 and shaft 44 and rocking movement of the arm 45 clockwise as shown in Fig. 1 against the action of counterweight 46, until the arm 45 is engaged by an adjustable stop screw 60 mounted on the bracket 42. The screw 60 is adjusted to insure that in the absence of any box contacting the wheel A, arms 17 will drop to a position carrying rolls 26 beneath the operating level of adhesive 32 in the tank 14.

The shaft 15 is also provided with a handle 70 at its end opposite the pulley 56 useful in making initial adjustments. This handle can be affixed to the shaft or loosened therefrom as by a set screw 72.

The operation of the mechanism is as follows:

A box A having the standard dimensions of a group of boxes to be loaded on pallets is placed on the conveyor under wheel 50 which is manually lifted onto the top of the box A. The bracket 42 is then adjusted vertically of the standard 40 to bring it into a position relative to the wheel shaft 51, substantially as shown in Fig. 1. Meanwhile, pulley 52 has remained loose on the shaft 44. The set screw of handle 70 is then tightened and the handle 70 is moved in a counterclockwise direction as shown in Fig. 1 to move the applicator mechanisms upwardly until the rolls 26 contact the bottom of the box A as shown in Fig. 1. While the applicators are held in this position, the pulley 52 is rotated to take up any slack in the cable 54 and is then made fast to the shaft 44. The adjusting handle 70 may then be loosened from the shaft 15 so that it will not operate with the rest of the mechanism. The counterweight 46 is then adjusted (by replacement or otherwise) to almost but not quite overcome the turning moment of shaft 44 in bearing 43 induced by the combined weights of the actuating mechanism and of the applicator mechanism, both of which continuously tend to rotate shaft 44 in a clockwise direction as shown in Fig. 1 upon removal of box A.

As a series of boxes A are then passed along the conveyor from left to right as shown in the drawings, as each one contacts the periphery of the wheel 50, it will cause an upward motion of the wheel 50, a rocking movement of the arm 45 and oscillation of the arms 17 through the cable 54 to carry the rolls 25 and 26 from the dotted line positions indicated in Fig. 1 to the full line positions thereof with roller 26 bearing against the undersurface of the box A. In this position it will be noted that roller 25 still remains partially immersed in the liquid adhesive 32 and as the box A passes to the right as shown in Fig. 1, friction will cause rotation of both wheel 50 and rolls 26. In turn, rotation of rolls 26 will induce counterrotation of rolls 25 and, accordingly, feed rolls 25 will pick up adhesive from the tank 14, transfer it to the raised rolls 26, which will in turn transfer adhesive in two rows forming a pattern of longitudinally and laterally segregated inclined parallelograms to the undersurface of box A, which extends laterally on both sides of mechanisms 16. As soon as box A passes from beneath wheel 50, the turning moment of the mechanisms will cause the applicator rolls 25 and 26 to immediately drop into tank 14 beneath the surface of the normal liquid level of the adhesive 32. By reason of the configuration of the rolls 12 and the spacing of the collars 13 on each side of rolls 26, the applied patches of adhesive will not contact the rollers 12 or longitudinally alined rows of laterally spaced collars 13 as the box A passes to the right; and remain in condition for sticking to another box when removed from the conveyor. If desired, the number of collars 13 on each shaft 12 may be reduced to two, omitting the center collar, in which case the remaining collars 13 may be carried by stub shafts.

The application is repeated with each passage of a box.

Because of the adjustability of the actuating mechanism, the apparatus may be adjusted to accommodate and apply adhesive properly to boxes of varying height and/or width. Also, arms 17 are so mounted on shaft 15 that they may be adjusted laterally of the apparatus, as well as collars 13, to accommodate various widths of boxes A. Similarly, the number of applicator mechanisms may exceed the two shown.

The normal immersion of rolls 25 and 26 in the adhesive in the tank 14 will prevent caking of adhesive thereon, the adhesive being in the upper position shown in Fig. 1 only while adhesive is actually being applied to a box. The provision of the feed roll 25 is made necessary by the limited diameter of the applying roll 26 that is permitted because of the small spacing between adjacent rolls 12.

Adjustability of the height of the actuating mechanism and of the lateral spacing of the applicator mechanism 17 and collars 13 permit versatile use of the apparatus at different times with boxes of different heights and widths. With proper adjustment, and with proper attention to the weight of counterweight 46, the wheel 50 will move upwardly when only slight force is applied to its lower periphery, such as may be applied by the motion of a box pushed along the conveyor with sufficient force to pass it into and beyond the space lying between the lower surface of the wheel and the plane of the conveyor. The large diameter of the wheel 50 is helpful in assuring ready automatic operation of the actuating mechanism by the motion of the box.

In order to improve the adhesive applying action of the rolls 25, their adhesive applying surfaces may be knurled, as indicated by the pebbling in Fig. 2.

Also, it will be understood that the boxes may be fed through the conveyor upside down, so that application of adhesive is made to the top rather than the bottom surfaces, or they may be alternated.

We claim:

1. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, said applicator being carried by an arm mounted for pivotal movement about an axis parallel to the plane of said conveyor and perpendicular to the direction of movement of said articles along said conveyor, and actuating means for moving said applicator from inoperative submerged to operative adhesive applying position.

2. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, said applicator being carried by an arm mounted for pivotal movement relative to said conveyor plane and said applicator being yieldably mounted on said arm for cushioning the shock of movement thereof into operative position against the undersurface of the article passing along said conveyor, and actuating means for moving said applicator from inoperative submerged to operative adhesive applying position.

3. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, said applicator including an applying roll movable from a position beneath the normal level of adhesive completely above said normal level and a feed roll contacting and movable bodily with said applying roll but adapted to remain at least in part beneath said level when said applying roll is above said level, and actuating means for moving said applicator from inoperative submerged to operative adhesive applying position.

4. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, said applicator including an applying roll having a surface interrupted by relieved portions extending at an angle to a direction circumferential of said roll with the adhesive applying portions of said surface on either side of said relieved portions overlaping axially of the roll, for applying segregated patches of adhesive to the article and a feed roll having constant surface contact with the adhesive applying surface portions of said applying roll for feeding adhesive to said applying roll, and actuating means for moving said applicator from inoperative submerged to operative adhesive applying position.

5. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, and actuating means for moving said applicator from inoperative submerged to operative adhesive applying position, said actuating means comprising a wheel pivotally supported over said conveyor plane and adapted to be lifted by an article moved along said conveyor and roll along the top surface of said article.

6. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, and actuating means for moving said applicator from inoperative submerged to operative adhesive applying position, said actuating means comprising a wheel pivotally supported over said conveyor plane and adapted to be lifted by an article moved along said conveyor and roll along the top surface of said article, said apparatus further including means for varying the height of said wheel over the conveyor plane.

7. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, and actuating means for moving said applicator from inoperative submerged to operative adhesive applying position, said actuating means comprising a lever pivotally supported over said conveyor plane and normally in an inoperative position extending into the path of articles to be moved along said conveyor, and adapted to be pivoted by an article moved along said conveyor to an operative position out of the path thereof, mechanical connection between said lever and said applicator and a counterweight associated with said lever to almost but not quite overcome the turning moment of said lever when it is in inoperative position.

8. Apparatus of the character described comprising a conveyor for moving articles along a plane, including a plurality of longitudinal rows of laterally spaced rollers, a tank for holding liquid adhesive beneath said conveyor, an adhesive applicator movable bodily from an inoperative position wholly submerged beneath the normal operating level of a body of adhesive held in said tank to an operative position extending above said level to said conveyor plane between said longitudinal rows to engage and apply adhesive to the bottom surface of an article as it passes along said conveyor in areas not contacted by said rollers, said applicator being carried by an arm mounted for pivotal movement about an axis parallel to the plane of said conveyor and perpendicular to the direction of movement of said articles, and actuating means for moving said applicator from inoperative to operative position.

9. Apparatus of the character described comprising a conveyor frame, rollers for supporting articles moved thereover, including a plurality of longitudinal rows of laterally spaced rollers contacting said articles only at spaced lateral intervals, a tank located beneath said conveyor for holding a liquid adhesive, a shaft journalled on said frame beneath said rollers, arms extending from said shaft into said tank, a slide in each arm, yieldable means normally urging said slides to extended positions relative to said arms, an adhesive feed roll mounted in each slide, an applying roll mounted in each slide and having surface contact with said feed rolls, actuating means extending into the path of articles passing along said conveyor and movable thereby to a position out of the path of said articles for oscillating said shaft and arms from positions wherein said applying rolls are below the normal operating level of a body of adhesive held in said tank to positions extending upwardly between said longitudinal rows but with said feed rolls still below said adhesive for yieldingly bringing said applying rolls into engagement with the bottom of an article to apply adhesive thereto in areas which do not contact subsequent conveyor rollers.

10. Apparatus of the character described comprising a conveyor for moving articles along a plane, a tank for holding liquid adhesive beneath said conveyor, an adhesive applicator movable bodily from an inoperative position wholly submerged beneath the operating level of a body of adhesive held in said tank to an operative position extending above said level to said conveyor plane to apply adhesive to the bottom surface of an article positioned on said conveyor, and article contacting means directly actuated by articles on said conveyor for moving said applicator from inoperative submerged to operative adhesive applying position.

ALEXANDER W. MOFFAT.
WILLIAM E. WHITNEY.

REFERENCES CITED

The following references are of record in the file of this patent:

UNITED STATES PATENTS

| Number | Name | Date |
|---|---|---|
| 1,053,602 | Holly | Feb. 18, 1913 |
| 1,145,996 | Julian | July 13, 1915 |
| 1,179,672 | Smith | Apr. 18, 1916 |
| 1,744,148 | Sokolow | Jan. 21, 1930 |
| 1,810,223 | Peterson | June 16, 1931 |
| 1,898,653 | Bleier | Feb. 21, 1933 |
| 2,072,663 | Bedford | Mar. 2, 1937 |
| 2,237,641 | Von Hofe | Apr. 8, 1941 |
| 2,317,330 | Lockwood | Apr. 20, 1943 |
| 2,371,424 | Card | Mar. 13, 1945 |
| 2,476,097 | Kagen et al. | July 12, 1949 |
| 2,489,054 | Sprolle | Nov. 22, 1949 |
| 2,490,077 | McDonald | Dec. 6, 1949 |

OTHER REFERENCES

"Glued Pallet Loads Reduce Costs, Protect Cartons," article, Food Industries (vol. 84—pp. 750–751), July 1945.

"Progress Report on Glued Unit Loading System"—General Information Series No. 506—published by Ass'n. of American Railroads—Freight Loading and Container Section—59 East Van Buren St., Chicago 5, Ill.—Oct. 1, 1946.